(12) United States Patent
Gleckman et al.

(10) Patent No.: US 6,389,772 B2
(45) Date of Patent: May 21, 2002

(54) UNIVERSAL BUILDING UNIT FOR BUILDING STRUCTURES

(76) Inventors: William B. Gleckman, 310 E. 69th St., New York, NY (US) 10021; Jacques Racine, 424 E. 82nd St., New York, NY (US) 10028

( * ) Notice: Subject to any disclaimer, the term of this patent is extended or adjusted under 35 U.S.C. 154(b) by 0 days.

(21) Appl. No.: 09/848,194

(22) Filed: May 3, 2001

Related U.S. Application Data (63) Continuation-in-part of application No. 09/552,040, filed on Apr. 19, 2000.

(51) Int. Cl.$^7$ ................................................. E04B 2/00
(52) U.S. Cl. ................ 52/582.1; 52/281; 52/282.1; 52/299; 52/645; 52/220.1; 52/220.3; 165/48.1; 165/48.2; 165/49; 165/54; 237/69; 34/395; 34/396; 34/489; 34/511; 34/512; 34/77
(58) Field of Search ......................... 52/582.1, 281, 52/282.1, 299, 645, 220.1, 220.3; 165/48.1, 48.2, 49, 54; 237/69; 34/395, 396, 489, 511, 512, 77

(56) References Cited

U.S. PATENT DOCUMENTS

| | | | |
|---|---|---|---|
| 3,466,828 A | * | 9/1969 | November .................... 52/475 |
| 4,194,333 A | | 3/1980 | Paton et al. |
| 4,423,576 A | | 1/1984 | Farina et al. |
| 4,783,941 A | | 11/1988 | Coper et al. |
| 5,138,802 A | | 8/1992 | Lechner |
| 5,239,798 A | | 8/1993 | Saito |
| 5,538,075 A | * | 7/1996 | Eubank et al. .............. 165/48.1 |
| 5,890,339 A | | 4/1999 | Willis |
| 5,924,256 A | | 7/1999 | Ito |
| 6,131,653 A | * | 10/2000 | Larsson ....................... 165/228 |
| 6,138,379 A | * | 10/2000 | DeVore et al. ................. 34/395 |

FOREIGN PATENT DOCUMENTS

| | | | |
|---|---|---|---|
| EP | 0567735 A1 | * | 2/1993 |
| EP | 0567735 | | 11/1993 |

\* cited by examiner

*Primary Examiner*—Carl D. Friedman
*Assistant Examiner*—Chi Q. Nguyen
(74) *Attorney, Agent, or Firm*—Collard & Roe, P.C.

(57) ABSTRACT

A universal building unit comprising a plurality of members connected to each other by at least one adjustable plate. There is also at least one panel connected to the plurality of members. In this case, the plurality of members, the adjustable plate, and the panels all connect together to form a universal building unit that can be repeatedly constructed and combined with adjacent building units to form a building structure. These building units also contain a heating and cooling system for heating and cooling each unit within the structure. In addition, these units can be combined in any manner to create stairs, walls, doors, fixed and movable partitions, windows, roofs, or any other type of building component. These building units comprise a series of simple, easy to install fittings and steel profiles to create framing for any type of building.

18 Claims, 11 Drawing Sheets

UNIVERSAL BUILDING UNIT FOR BUILDING STRUCTURES

CROSS REFERENCE TO RELATED APPLICATIONS

This application is a continuation-in-part application of U.S. Patent Application Ser. No. 09/552,040 filed on Apr. 19, 2000 and benefit is claimed under 35 U.S.C. §120.

BACKGROUND OF THE INVENTION

Most buildings today are constructed with numerous drawbacks such as excessively long construction time, expensive specialized labor and equipment, poor workmanship, lack of fire-resistance and inefficient heating, cooling and ventilation systems. This invention relates to a series of simple, easy to install steel fittings and profiles to create framing for any type of building. In addition, the invention comprises special panel units to form floor, wall, ceiling and roof cladding to achieve improved radiant heating/cooling, ventilation and fire-resistance at a lower cost than present methods.

SUMMARY OF THE INVENTION

A universal building unit is provided comprising a plurality of members joined to each other by at least one connector. There is also at least one panel connected to the plurality of members. In this case, the plurality of members, the connectors, and the panels all join together to form a universal building unit that can be repeatedly constructed and combined with adjacent building units to form a building structure. These building units also contain a heating and cooling system for heating and cooling the occupants of the structure. These connectors can be set in position and adjusted in order to fit the building units to any desired length or height.

Further, these units can be combined in any manner to create stairs, walls, doors, fixed and movable partitions, windows, roofs, or any other type of building component. These building units also comprise a series of inexpensive, easy to install steel fittings and profiles to create framing for any structure. These building units could even be used as scaffolding to erect a building as well. In addition, because this building unit is assembled from parts that can be handled by individuals, no cranes are needed to complete the construction of a building unit or a building structure made from these building units.

The closed circuit heating/cooling system includes a series of tubes within the structural members. These tubes are connected to a water pump, hot water heater and cold water chiller. Further, the system includes a three-way mixing valve, and thermostat for controlling the temperature of the water flowing through the tubes.

The structure is erected with a plurality of members connected to an adjustable header or plate. For example, the adjustable header or plate is connected to the first member at each end of this member. Successive members are connected to the adjustable headers or plates and positioned as required to achieve the desired height and length of the final assembled building unit. The members are connected to the adjustable headers or plates by bolting or welding.

BRIEF DESCRIPTION OF THE DRAWINGS

Other objects and features of the present invention will become apparent from the following detailed description considered in connection with the accompanying drawings, which disclose several embodiments of the present invention. It should be understood, however, that the drawings are for the purpose of illustration only and not as a definition of the limits of the invention.

In the drawings wherein similar reference characters denote similar elements throughout the several views:

FIG. 4B is a cross-sectional view of two members bolted together back to back with a tightening nut in between;

DETAILED DESCRIPTION OF THE PREFERRED EMBODIMENT

Figure 1A:
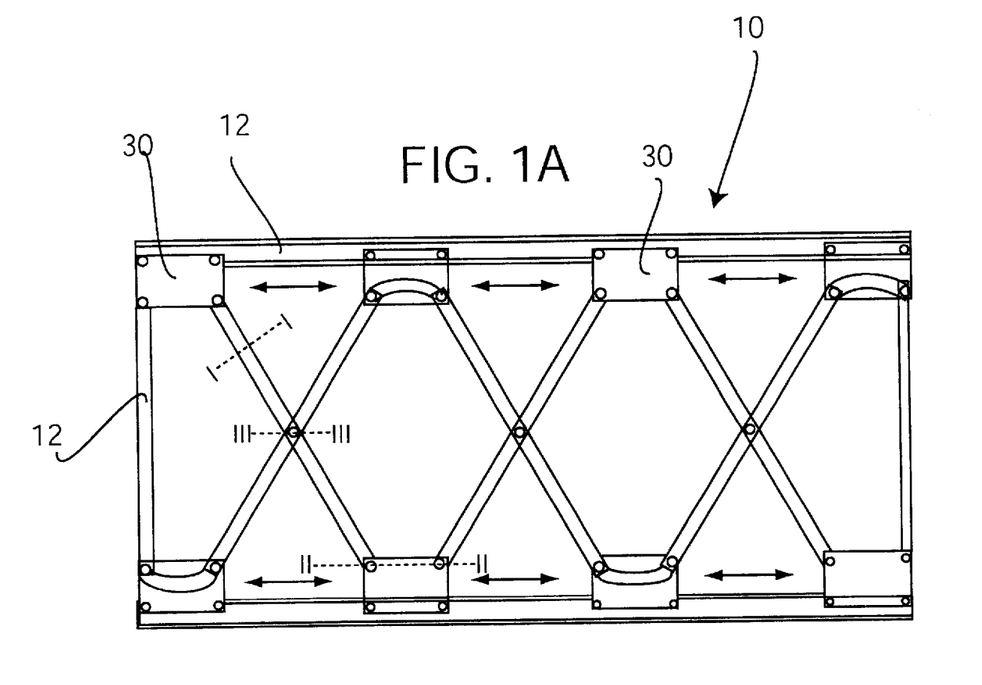
FIG. 1A is a side view of the building unit.

Referring now in detail to the drawings, FIG. 1A represents a side view of a structural portion of building unit 10 comprising a plurality of members 12 connected directly to each other via a series of nuts and bolts or connected to each other via adjustable plates 30. Members 12 can be inserted into the ground so that this building unit 10 does not need a foundation. Instead, once a first set of members 12 have been sunk into the ground, additional members 12 can be attached to these members to form a building unit.

Members 12 are made from 12 gauge cold rolled, pickled and oiled steel struts that are preferably made from AISI 1021 grade steel that is $1\frac{5}{8}$ inches wide high×varying depths: $\frac{13}{16}$, 1, $1\frac{3}{8}$, $1\frac{5}{8}$ and $2\frac{7}{16}$ inches deep, of any length, fabricated with a precision of $\pm\frac{1}{16}"$. The steel has a yield strength of 50,000 to 55,000 PSI and a tensile strength of between 70,000–80,000 psi. The steel members are hot-rolled flat billets cold-formed into G-shaped strut profiles.

Figure 1B:
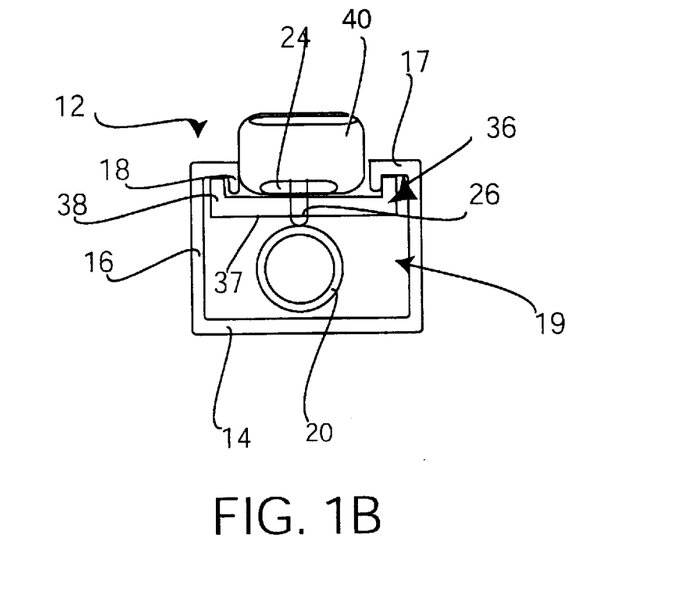
FIG. 1B is a cross-section through a building unit member.

As shown in FIG. 1B, members 12 have a base section 14, arms 16, face section 17, and crimped sections 18 forming grooves 19 on both sides of member 12. Inside of these members are tubing 20 that can be made from rubber tubing, nylon 11, cross-linked polyethylene and can be secured inside members 12.

Coupled to member 12 is a back plate 36 which has a base section 37 and two opposite spaced flanges 38 extending substantially perpendicular to base section 37. Flanges 38 extend into grooves 19 within member 12. Back plate 36 couples to a connector plate 40 via nut 24 and bolt 26.

Tubing 20 coupled with members 12 form a temperature control system that can either raise or lower the temperature of a room through radiant heating or radiant cooling. Tubing 20 is filled with temperature controlled water which reacts with members 12 by either transferring heat to members 12 or by drawing heat away from members 12.

Members 12 are connected to each other at an angle which gives this building unit a series of advantages. First, the same basic length of members 12 can swivel to provide any desired height of wall or partition. Second, members 12 become self-bracing, eliminating the need for cross-bridging or blocking associated with rectilinear framing systems. Third, the skewed positioning of members 12 affords easy insertion and turning of the heat/cool tubing 20, eliminating the need for the installation of labor-intensive tube fittings and their concomitant danger of leaking.

Adjustable plates 30 can be connected to members 12 via a nut 24 and bolt 26. In addition, members 12 can be connected to each other directly via nut 24 and bolt 26. Adjustable plates 30 can be slid along a substantially horizontal member 12 so that the height of a structural unit can be controlled.

Figure 2:
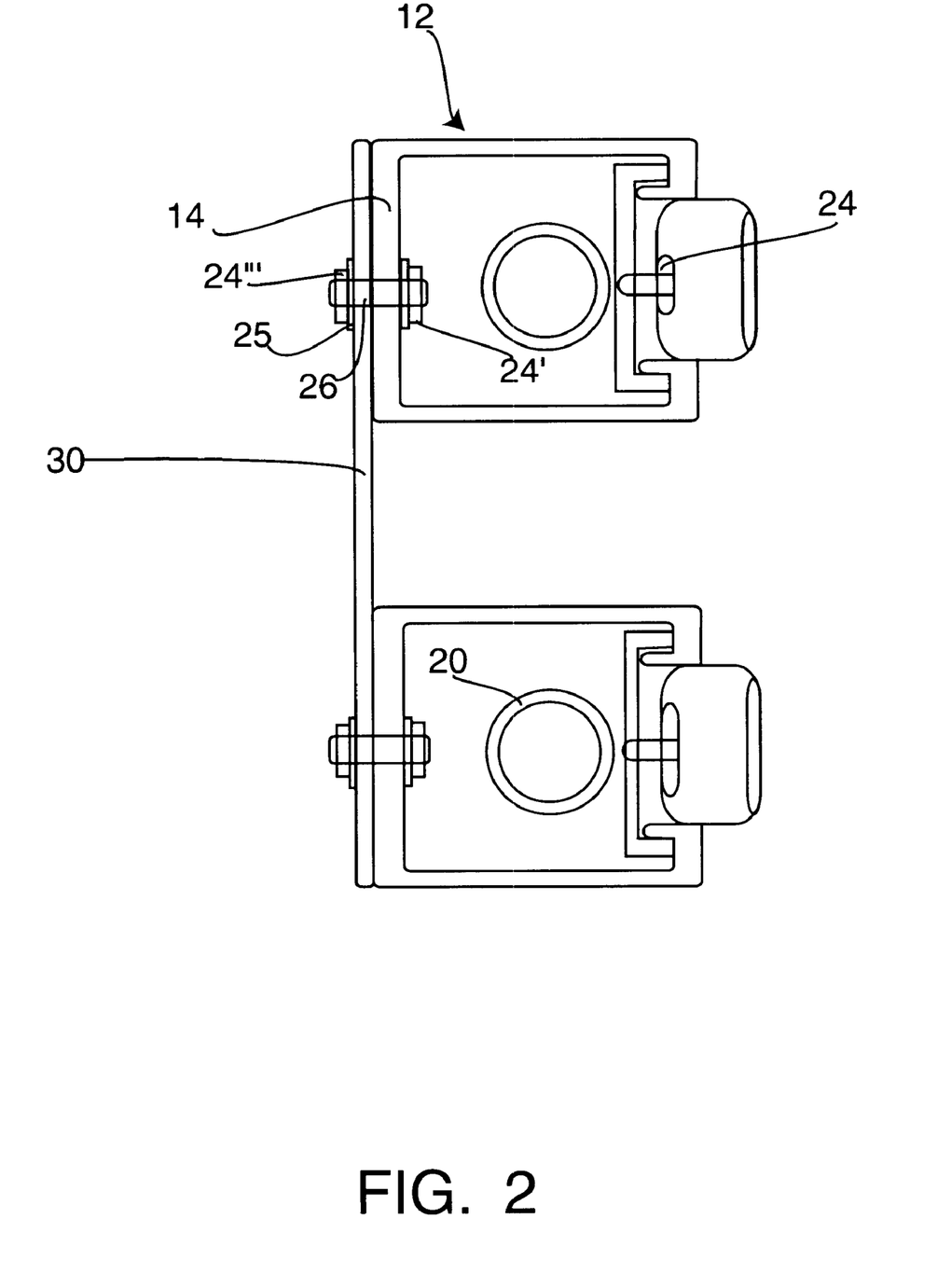
FIG. 2 is a side view of the adjustable plate connected to two members.

FIG. 2 shows a cross-sectional view taken along the line II—II on FIG. 1A which shows two members 12 joined together via adjustable plate 30. As shown, nuts 24 and bolts 26 connect base 14 of members 12 to plate 30. Bolts 26 slide through pre-drilled holes on both plate 30 and members 12. Bolts 26 are held in place by washers 25 in combination with nuts 24' and 24".

Figure 3:
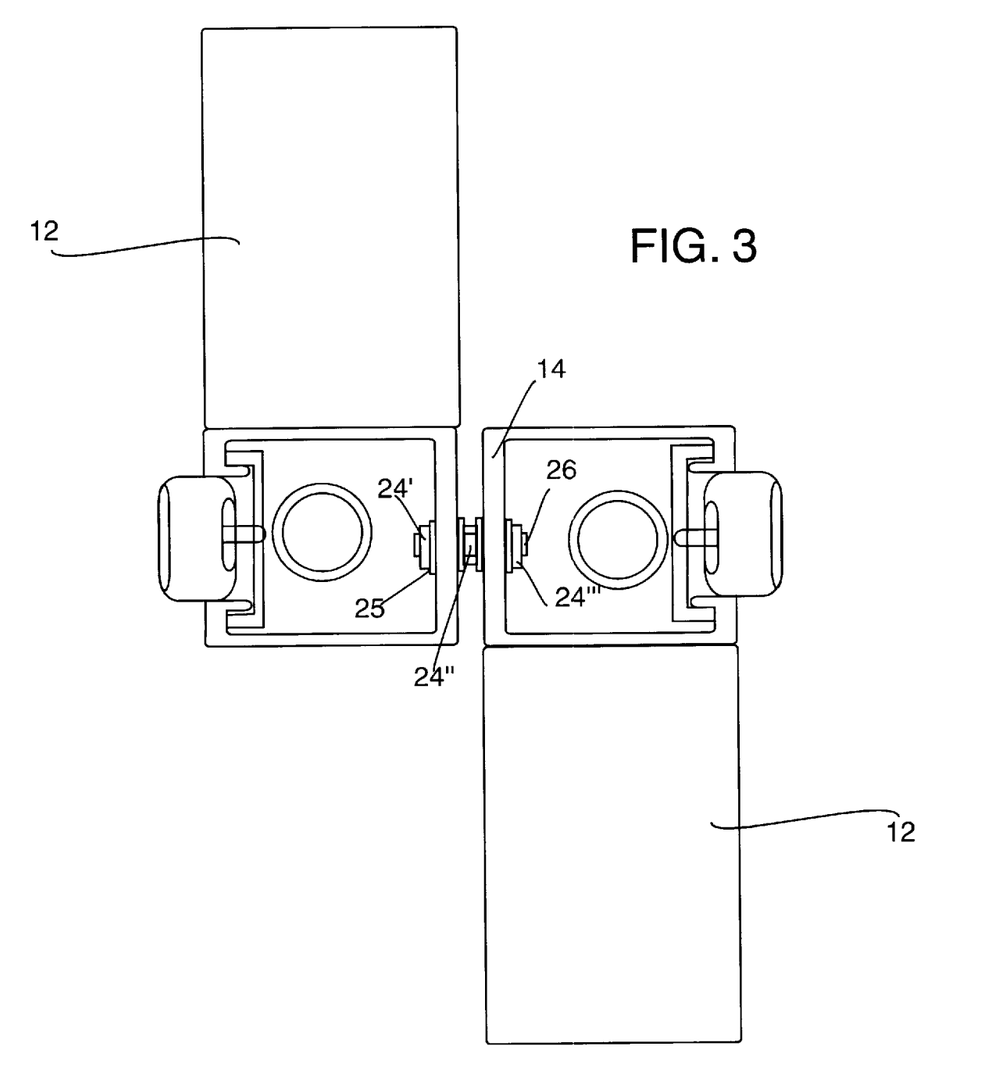
FIG. 3 is a side view of two members bolted together.

FIG. 3 shows a cross sectional view taken along line III—III in FIG. 1A which shows two members 12 joined together back to back in a crossing manner. In this view, bolt 26 connects members 12 together with three nuts 24', 24", and 24'". Nuts 24' and 24'" are disposed within members 12 while nut 24" is disposed between members 12. There are also a plurality of washers 25 which are disposed between nuts 24', 24", and 24'", and members 12. Members 12 can be tightened together using a socket wrench turning nut 24" which will then turn bolt 26 within nuts 24' and 24'".

Figure 4A:
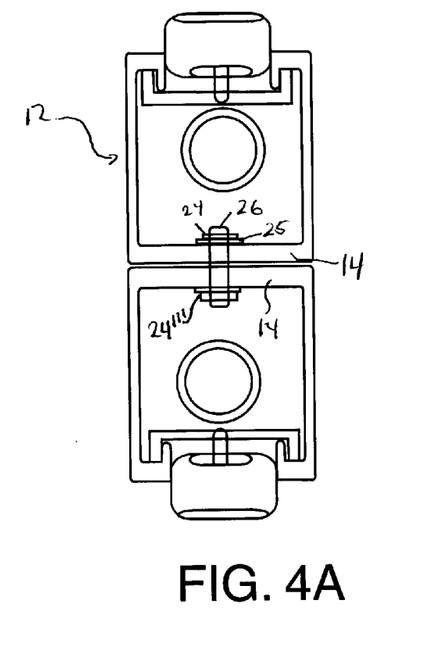
FIG. 4A is a cross-sectional view of two members bolted together back to back.
Figure 4B:
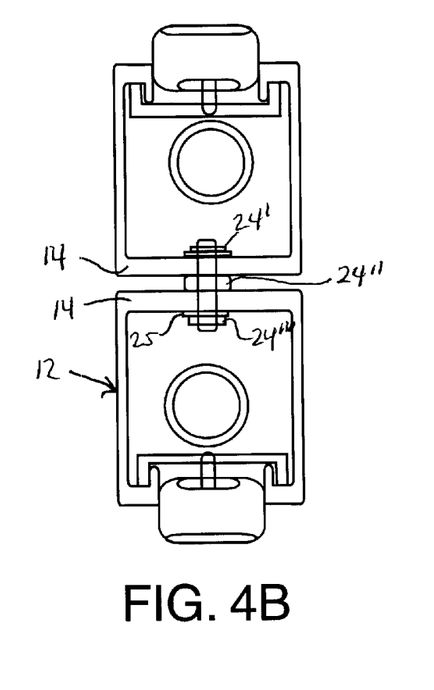
Figure 4C:
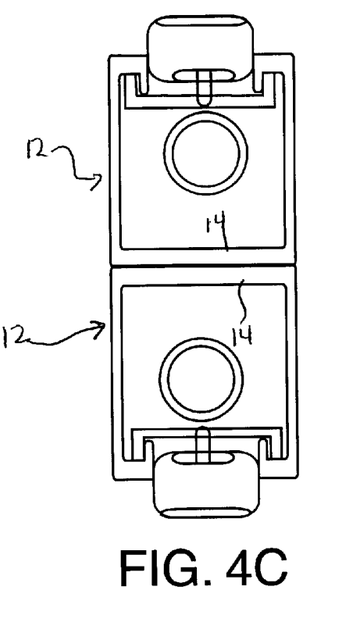
FIG. 4C is a cross-sectional view of two members welded together back to back.
Figure 4D:
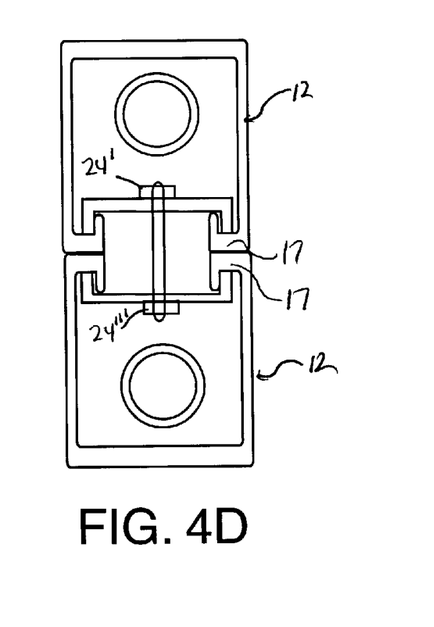
FIG. 4D is a cross-sectional view of two members bolted together face to face.

FIGS. 4A, 4B, 4C and 4D show how members 12 can be coupled together. For example, in FIG. 4A, members 12 can be coupled so that bases 14 are pressed together with bolt 26 coupling both bases together via nuts 24' and 24'". FIG. 4B shows members 12 being coupled together as shown previously in FIG. 3. FIG. 4C shows members 12 with bases 14 being coupled together via welding or any other type adhesive. Finally, FIG. 4D shows face sections 17 of members 12 being coupled together via bolt 26, nuts 24' and 24'" and back plate 36.

Figure 5:
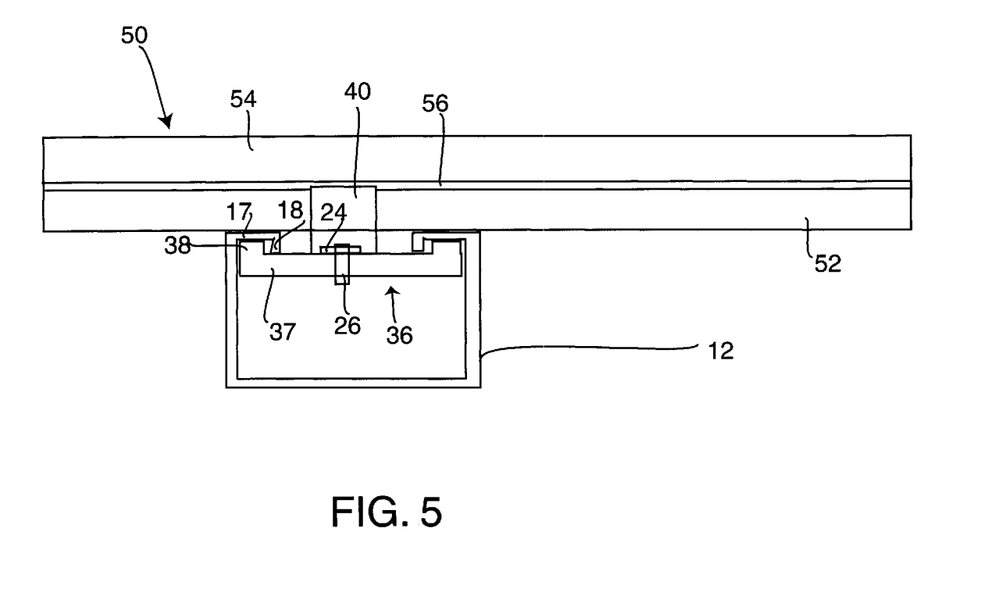
FIG. 5 is a top view of the clip attachment of panels to members on one side forming a building unit.

FIG. 5 shows a top view of a building unit showing double paned glass panels 50 being fixed to members 12 via connector 40. Double paned glass panels 50 consist of a first pane 52, and a second pane 54. Disposed between both panes is an adhesive bond 56 that secures both panes together. Once bond 56 dries, it forms a gap 58 (see FIG. 6) so that connector 40 can fit therein and secure panes 50 to member 12. Panels 50 are coupled to member 12 via connector 40 which is fastened to member 12 via back plate 36, nut 24 and bolt 26. As nut 24 is tightened, connector 40 pulls flanges 38 into a back face of face section 17. Panel 52 is also pulled into a front face of face section 17.

Figure 6:
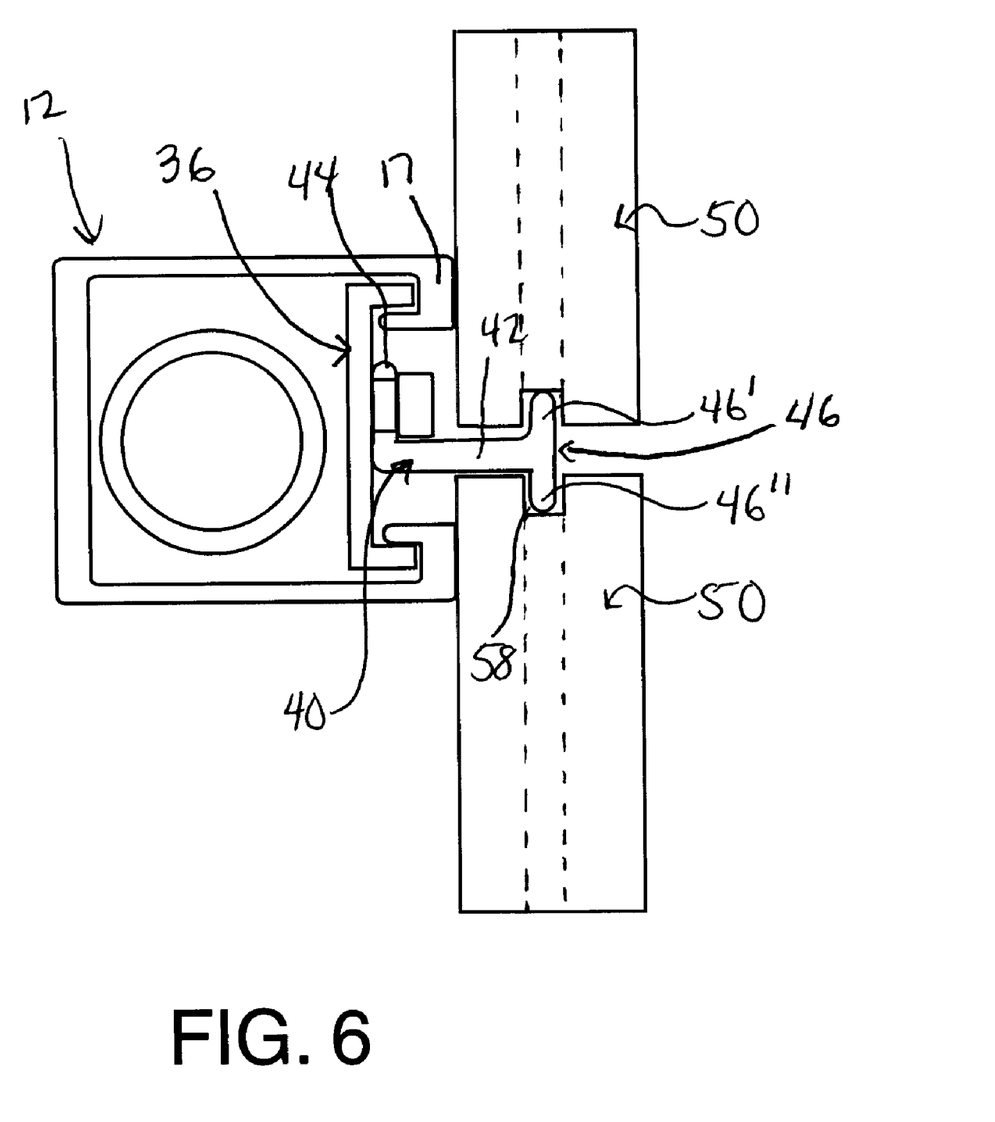
FIG. 6 is a cross-section view of the clip attachment of panels to a member.

FIG. 6 shows a cross sectional view of member 12 which shows back plate 36 coupling to panels 50 via connector 40. Connector 40 has a base section 42, a first prong section 44 coupled to back plate 36 and a second prong section 46 including opposite spaced prongs 46' and 46". Opposite spaced prongs 46' and 46" fit inside of gaps 58 in panels 50 to secure panels 50 to member 12. Once connector 40 is secured to members 12, panels 50 are slid on to prongs 46' and 46" to secure panels 40 to face sections 17 of members 12.

Figure 7:
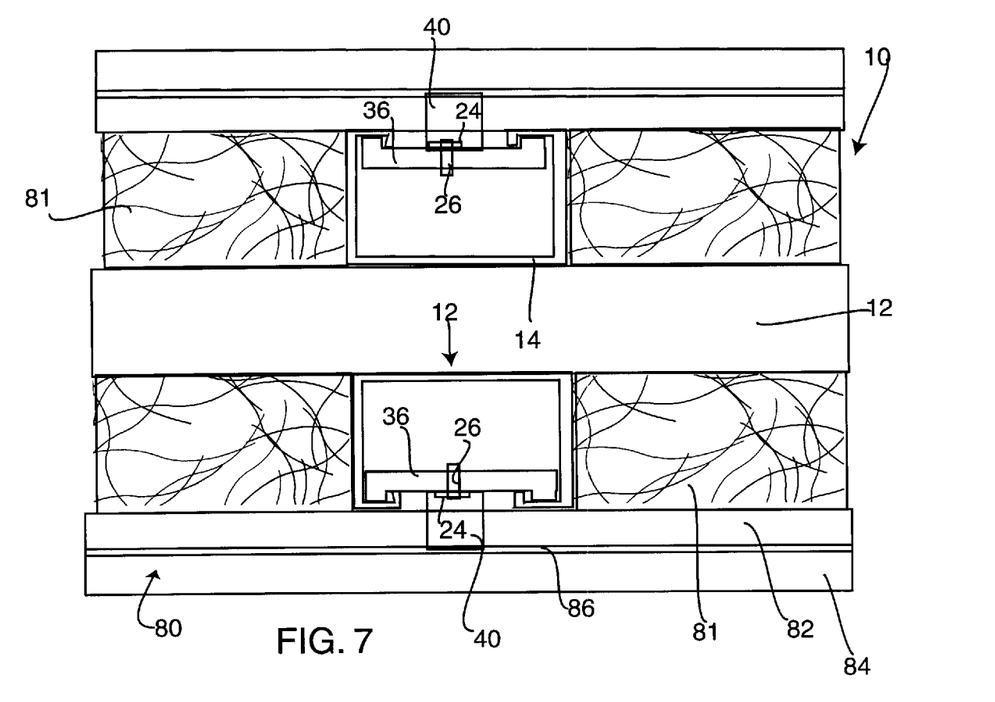
FIG. 7 is a cross-sectional view of panels, members and insulation.

FIG. 7 shows a top view of a building unit comprising a three-layer system of members 12. With this design, there are a series of panels 80 made from Viroc cement board. Disposed between these panels 80 is insulation 81 made from mineral wool to create a fire resistant building unit 10 that forms a two-hour fire rated building structure. Panels 80 include two separate part panels 82 and 84 coupled together via an adhesive 86. These panels are coupled together to form an air tight water resistant seal. Thus, once each building is constructed, it forms a waterproof building unit that can be repeatedly stacked to form a waterproof building structure. As in FIG. 5, back plate 36, along with connector 40, nut 24 and bolt 26 work together to couple back plate 36 to panels 80.

Figure 8:
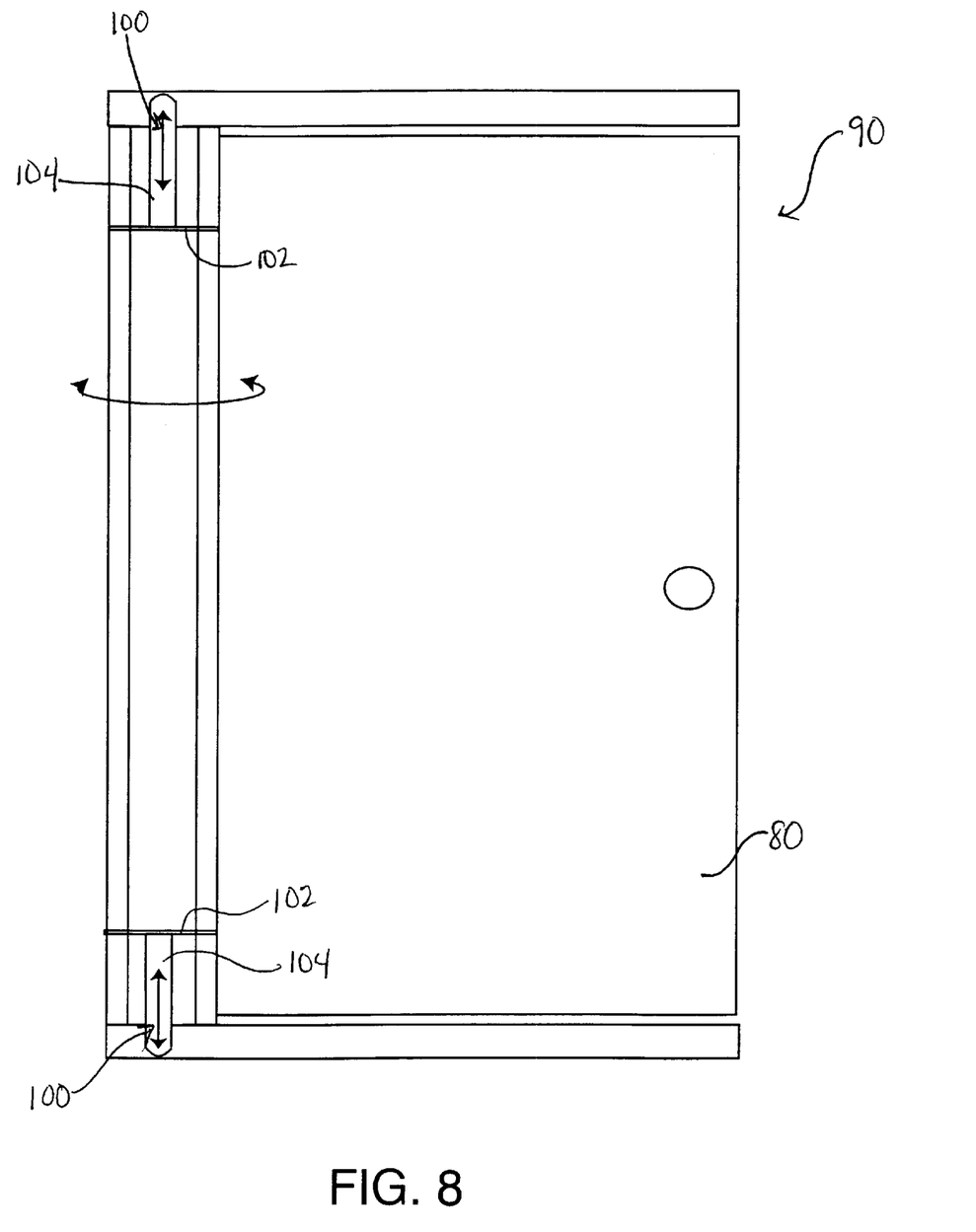
FIG. 8 is a side view of a spring loaded pivot for a frameless door.
Figure 9:
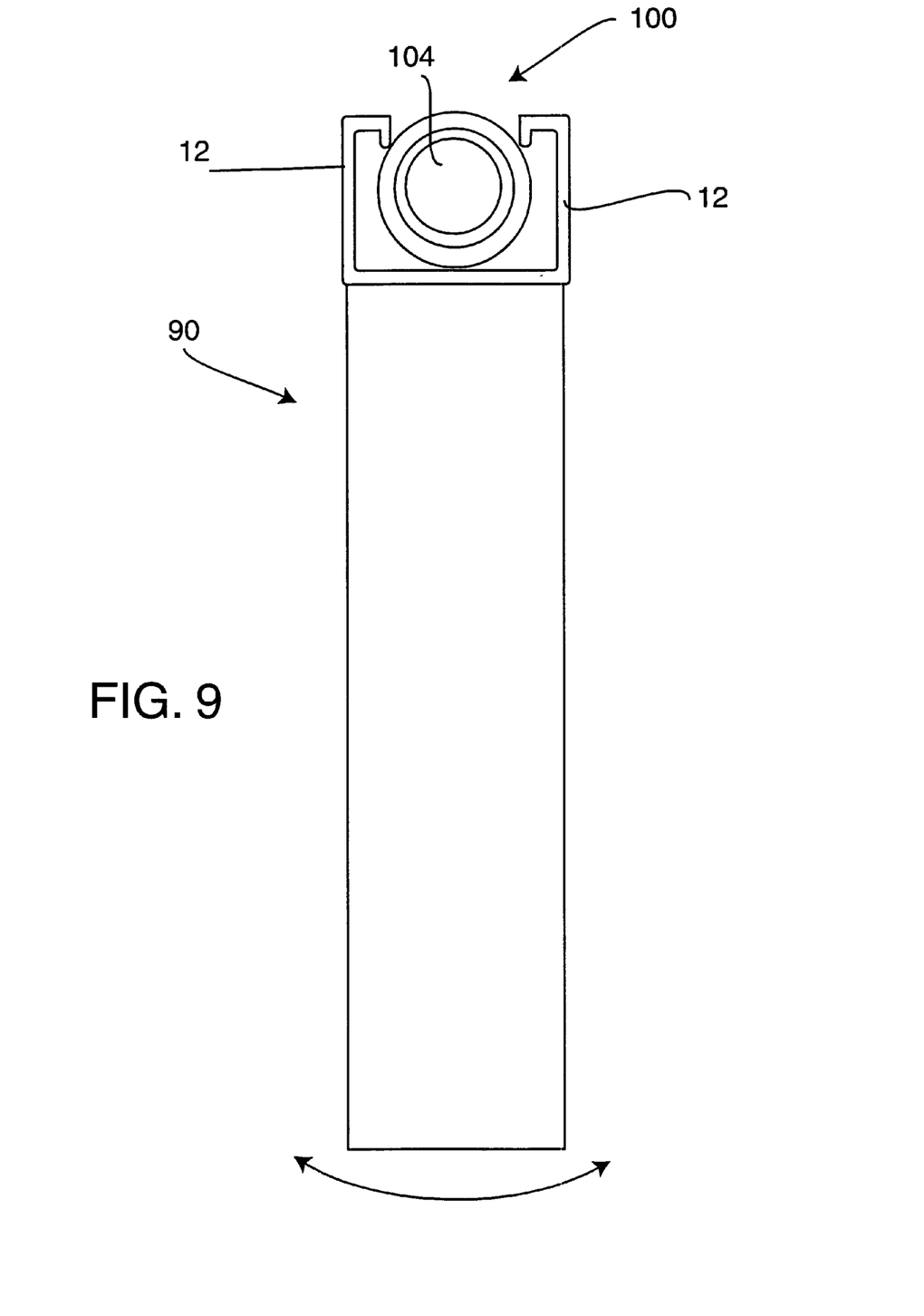
FIG. 9 is a top view of the spring loaded pivot for a door.

FIG. 8 shows a door 90 formed by member 12, and two spring based pivots 100 disposed inside of member 12 and panels 80 coupled to members 12. Spring based pivots 100 comprise a base plate 102 that secures to member 12 and a spring loaded insert 104 that snaps into a recess in a door frame. A door can be coupled to the door frame by lining up spring loaded insert 104 with the recess so that insert 104 snaps into this recess. In addition, FIG. 9 shows a top view of door 90 including pivot 100. Pivot 100 includes spring loaded member 104, which is disposed within member 12.

Figure 10:
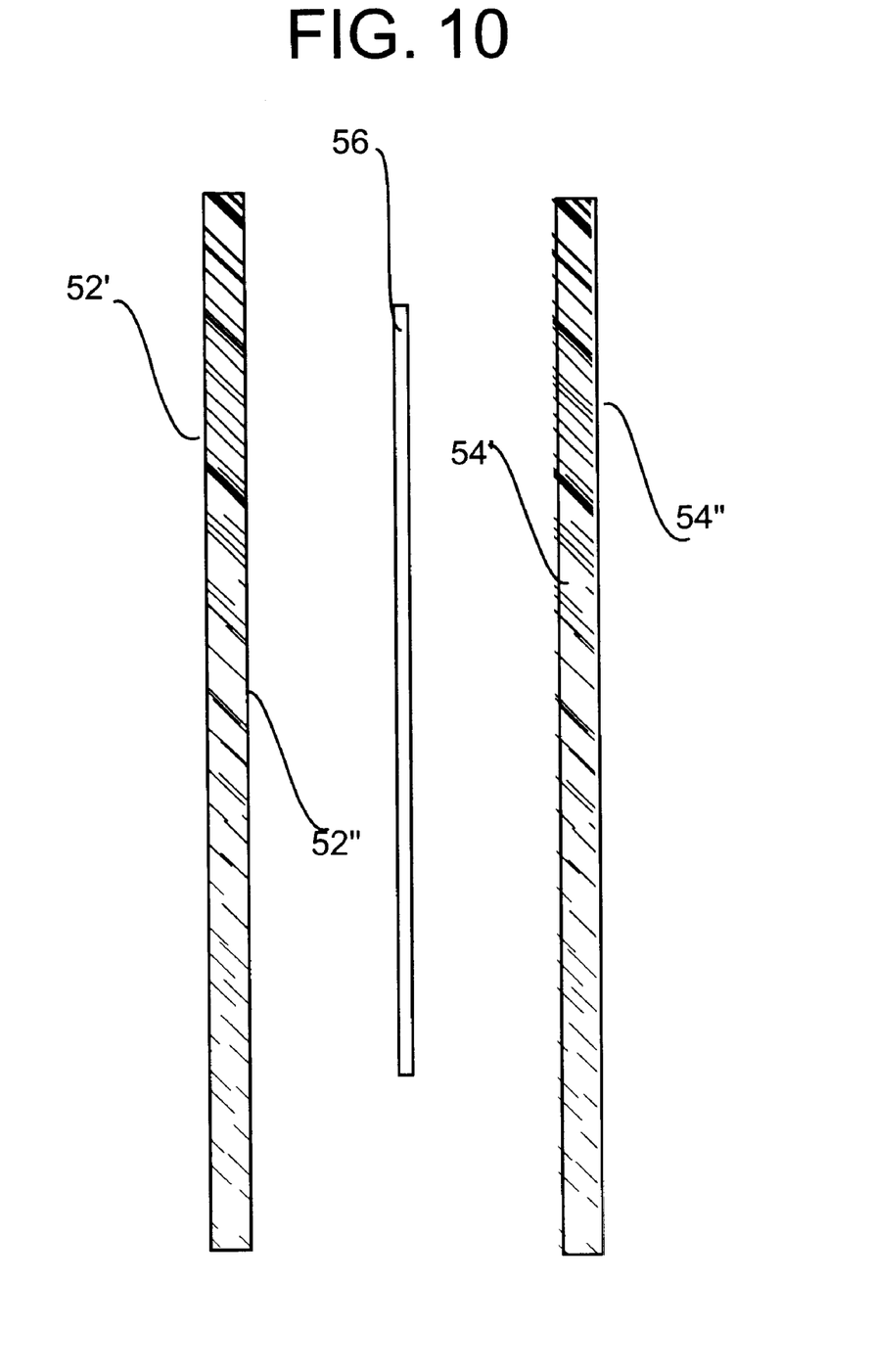
FIG. 10 shows the glass panes being placed together.

The building units formed by members 12 and either glass panels 50 or V-rock panels 80 can form a self enclosed heating and cooling unit as well. For example, as shown in FIG. 10, glass panels 52 and 54 which are joined together with adhesive 56 form an insulated double paned system that traps heat inside the structure in the winter and keeps the heat out in the summer. As shown in FIG. 10, panel 52, has a first side 52' and a second side 52" while panel 54 has a first side 54' and a second side 54". With this design faces 1 and 4, which comprise sides 52' and 54" are coated with a pyrolitic low E coating. Normally, clear glass has an Emissivity value of 0.84 while glass having a pyrolitic low E coating has an Emissivity value of 0.15. Essentially the lower the Emissivity value of the glass, the better it performs in reducing the emission of infrared radiation.

For example, an uncoated glass surface facing the interior of a building would permit most of the heat in the form of infrared radiation to pass through it to the exterior of the building. Similarly, an uncoated glass surface facing the exterior of the building would permit most of the solar radiation to pass through it to the interior of the building. However, if both the interior or the exterior glass surfaces have a pyrolitic low E coating, most of the interior building radiant energy would stay there and little of the solar radiant energy would enter the building.

Figure 11:
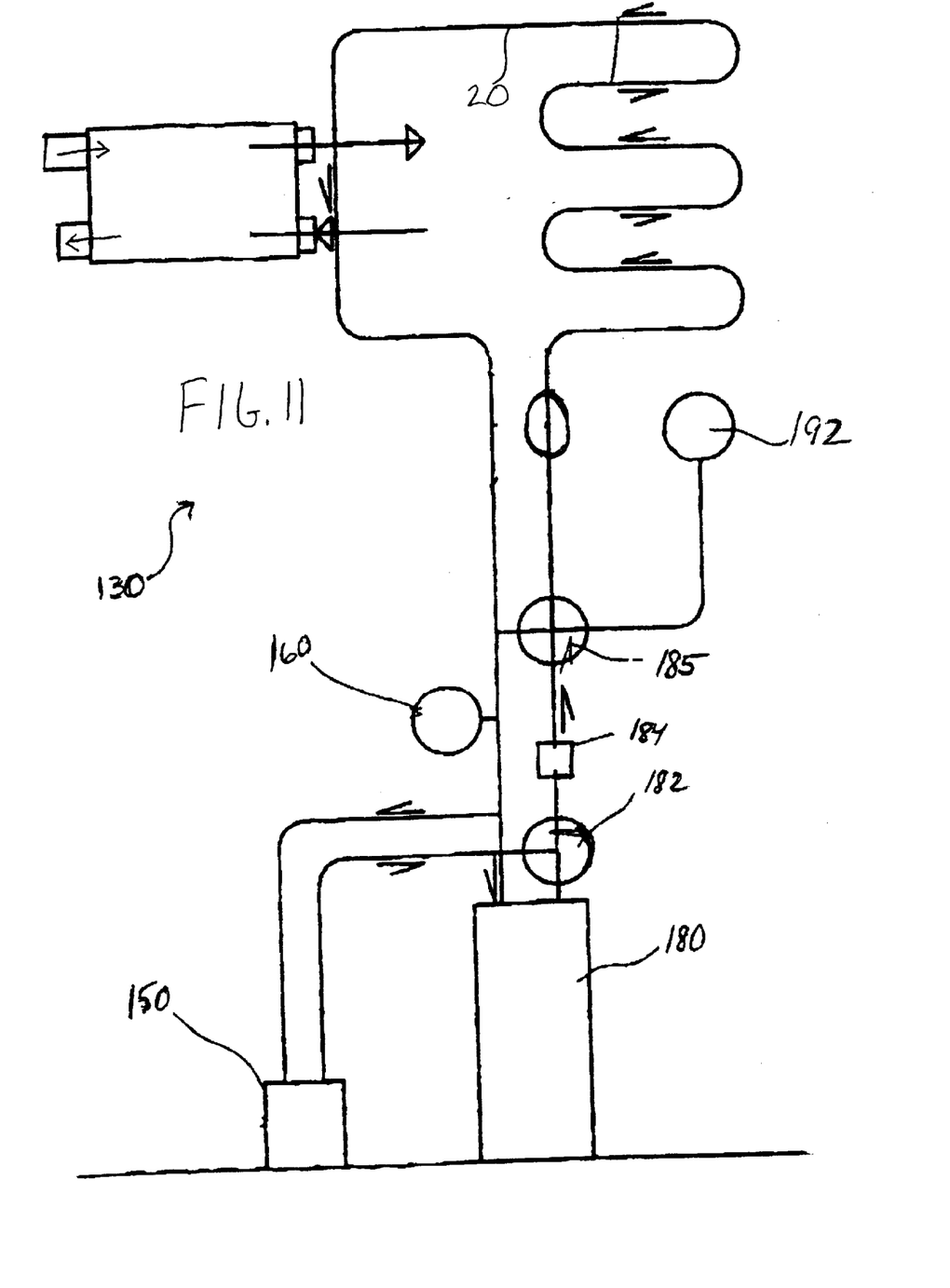
FIG. 11 is a schematic block diagram of the heating and cooling system.

FIG. 11 shows a schematic block diagram of a heating and cooling or temperature control system 130 that includes a series of tubes or tubing 20 for handling water. This temperature control system is designed to heat or cool a room through radiant heating or radiant cooling. For example, on a warm sunny day, cool water at approximately 60 degrees Fahrenheit is pumped through these tubes 20 to cool the adjacent members 12 and panels 80 coupled thereto. This cool water is enabled by a water chiller 150 and a stainless steel water pump 160 and/or by using ground water or direct earth cooling of the water. In contrast, during cooler months, such as the wintertime, water pump 160 circulates warm water through tubes 20. These members 12 and panels 80 can then reach a surface temperature of approximately 81 degrees Fahrenheit to heat people in a room through radiant heating. The heat source is a water heater 180 feeding hot water via water pump 160. There is precise temperature control in the system using a three-way mixing valve 185 actuated by non-electric thermostat 192 graduated in numerals instead of temperature settings. This design allows fine tuning of the comfort zone to suit the needs of specific occupants.

Once the water leaves either the cold water chiller 150 or the hot water heater 180, it is fed through a three way valve 182 and then through an expansion tank 184 before it is sent to three way mixing valve 185 to heat or cool a room.

In cold weather, warm water circulates through the tubing within the steel profiles transmitting heat to the floor, wall and ceiling surfaces which creates their surface temperature at 81 degrees Fahrenheit which is ideal for human comfort. This heat radiates into each room to heat the occupants. Similarly, summer cooling occurs through the circulation of cool water at 60 degrees Fahrenheit whereby the occupants lose heat through radiant cooling to these same surfaces. The building is heated and cooled by its own structural fabric so that there are no radiators, ducts or grilles.

This design can also be used to create a self heating structure whereby tubes 20 are placed just inside an exterior panel surface. This exterior level of tubing could be separate from an interior level of tubing disposed adjacent to the interior panels via a radiant heat barrier. This design will enable all the exterior surfaces of the building such as roofs, walls and even driveways to efficiently and invisibly absorb solar radiant energy thus obviating the necessity for obtrusive glass solar energy sources.

Accordingly, while several embodiments of the present invention have been shown and described, it is to be understood that many changes and modifications may be made thereunto without departing from the spirit and scope of the invention as defined in the appended claims.

What is claimed is:

1. A universal building unit comprising:
   a) a plurality of members;
   b) at least one adjustable fitting coupling at least two of said plurality of members together in a rotatable manner; and
   c) at least one panel connected to said plurality of members wherein said plurality of members, said at least one adjustable fitting and said at least one panel all connect together to form a universal building unit that can be repeatedly constructed and combined with adjacent building units to form a building structure; and
   d) at least one tube disposed in at least one of said plurality of members.

2. The universal building unit as in claim 1, wherein said plurality of members are hollow.

3. The universal building unit as in claim 1, wherein said plurality of members have a cross section that is substantially G-shaped.

4. The universal building unit as in claim 1, wherein said plurality of members are made from steel that is hot rolled for shaping and then pickled and oiled.

5. The universal building unit as in claim 1, further comprising a temperature control system for heating and cooling said building unit and for absorbing radiant solar energy.

6. The universal building unit as in claim 1, wherein said temperature control system heats and cools said building unit through radiant heating and cooling methods.

7. The universal building unit as in claim 6, wherein said temperature control system comprises:
   a water pump for pumping water through said series of tubes;
   a water heater coupled to said series of tubes;
   a water chiller coupled to said series of tubes; and
   a thermostat coupled to said at least one tube and in communication with said water heater and said water chiller wherein said thermostat alternately turns on said water heater and said water chiller to alternately heat or cool water inside said at least one tube so that when said water pump pumps water through said at least one tube disposed inside of said plurality of members said water can either heat or cool a room depending on the temperature of the water and the temperature of the room.

8. The universal building unit as in claim 1, wherein said temperature control system further comprises a three way mixing valve and wherein said thermostat is a non electrical thermostat such that said three way mixing valve controls a flow of water throughout said temperature control system.

9. The universal building unit as in claim 7, wherein said at least one tube is selected from the group made from a material consisting of: nylon 11, cross linked polyethylene, or rubber.

10. The universal building unit as in claim 1, wherein said at least one panel connects to said plurality of members via a bonding agent.

11. The universal building unit as in claim 1, wherein said at least one panel is formed from glass.

12. The universal building unit as in claim 11, wherein said at least one panel formed from glass comprises at least two layers of glass wherein an inside surface of a first layer of glass contains a pyrolitic low E coating and an outside surface of a second layer of glass contains a pyrolitic low E coating.

13. The universal building unit as in claim 1, wherein said at least one panel is made from a material selected from a group consisting of: Viroc cementboard, wood, metal, stone or tile.

14. The universal building unit as in claim 3, further comprising a rotatable pivot that is insertable into plurality of members so that so that said plurality of members are rotatable about a vertical axis forming either a door or a window.

15. The universal building unit as in claim 1, further comprising a connector for coupling said at least one panel to said plurality of members.

16. The universal building unit as in claim 13, further comprising at least one additional panel coupled to said plurality of members opposite said at least one panel and a set of insulation made from mineral wool disposed between said at least one panel and said at least one additional panel.

17. A universal building unit comprising:
   a plurality of members;
   at least one adjustable plate for coupling said plurality of members together;
   a series of flexible tubes disposed within said plurality of members;
   a series of panels coupled to said plurality of members, wherein said at least one adjustable plate is coupled to at least three members such that at least two of said at least three members have a freely rotational connection with said adjustable plate.

18. A method for building a building comprising:

providing a plurality of members;

coupling an adjustable plate to at least one member in said plurality of members so that said adjustable plate can slide axially along said at least one member;

rotationally coupling at least one additional member to said adjustable plate;

sliding said adjustable plate along said at least one member to set a height for a floor of said building;

coupling at least one panel to said plurality of members to form a building unit; and coupling said building unit to an additional building unit to form the building.

* * * * *